3,285,774
Patented Nov. 15, 1966

3,285,774
METHOD OF TREATING WOOD WITH AN ORGANIC SOLVENT-SOLUBLE FIRE RETARDANT
Irving S. Goldstein, Pittsburgh, and William J. Oberley, Pitcairn, Pa., assignors to Koppers Company, Inc., a corporation of Delaware
No Drawing. Filed Dec. 18, 1961, Ser. No. 160,322
6 Claims. (Cl. 117—136)

This invention relates to a new method of treating wood with an organic fire retardant solution. In one specific aspect, it relates to a method of impregnating wood with an organic solvent-soluble fire retardant in an organic solution whereby the external dimensions of the wood remain unaffected.

The many valuable uses of wood, especially in the construction of dwellings, has stirred scientists to seek improvements in its natural properties. Methods have been developed to protect wood from destruction by termites and fungus but, at the present time, no method exists for making wood completely fire resistant. There are, however, methods which render the wood flame retardant by chemically impregnating the wood throughout or coating the outer surfaces.

Impregnation techniques for making flame retardant wood involve the deposition of a chemical composition within the cells of the wood. Fire retardant chemicals may be pressure impregnated into the wood in sufficient quantity to effectively reduce the combustibility of the wood. Chemicals commonly used for this purpose include ammonium phosphate, ammonium chloride, ammonium sulfate, borax, boric acid, phosphoric acid, zinc chloride and magnesium chloride. Certain characteristics are required for these chemicals: (1) the chemical itself must not support combustion, and (2) it must so effect the cellulose that the cellulose will not support combustion after removal of the flame.

Thermal decomposition and combustion of untreated cellulose is due to the formation and rapid combustion of flammable vapors when cellulose is exposed to high temperatures. The carbonaceous matter, which remains after the flammable gases have undergone combustion, oxidizes more gradually by glowing until the organic matter is consumed leaving only a fluffy ash. It may, therefore, be the function of the flame retardant material to prevent rapid combustion by reducing the flammable vapors while correspondingly increasing the carbonaceous residue through an acid catalyzed dehydration mechanism.

Heretofore, wood was impregnated with an aqueous solution of water soluble chemicals, such as salts of sulfuric and phosphoric acid, to give flame retardant properties. This method was satisfactory for treating poles and unfinished lumber used industrially for purposes where dimensional uniformity was not required.

Unfortunately, the aqueous treatment causes the wood to swell resulting in dimensional distortions. This method cannot be used where dimensional uniformity is necessary, such as impregnating lumber which has been cut to size and shape. The aqueous method is further limited in use by the fact that the water soluble chemicals readily leach out of the impregnated wood when in contact with water. Lumber treated by this method can only be used in dry places and not for the exterior of buildings.

Quite surprisingly, we have discovered a new method of making wood fire retardant by impregnating the wood with an organic solution of an organic solvent-soluble compound whereby effective amounts of the compound are retained by the wood. Impregnation with organic solvents has eliminated swelling and dimensional distortions. Further, since the fire retardant compound is soluble in organic solvents and insoluble in water, leaching on contact with water has been prevented.

It is, therefore, an object of the invention to provide a new method of treating wood with a fire retardant material dissolved in an organic solvent.

It is a further object of the invention to provide a new method of treating wood with a fire retardant solution without creating dimensional distortions of the wood.

In accordance with our invention, we have discovered a new method of treating wood with an organic solvent-soluble fire retardant in an organic solution without affecting the external dimensions of the wood which comprises impregnating the wood, under impregnating pressures and at a temperature below the boiling point of the organic solvents at said pressures with a solution consisting essentially of a solute having the formula:

wherein R is a chlorinated lower alkyl radical, X is a hydroxy radical and $n$ is an integer having a value of from 1 to 2, and an organic solvent having a boiling point below about 80° C.

Compounds useful in our invention are the diesters of phosphoric and phosphorus acid. These compounds have the formula:

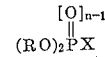

wherein R is a chlorinated lower alkyl radical, X is a member selected from the group consisting of hydroxy radical and hydrogen and $n$ is an integer having a value of from 1 to 2. Particularly useful compounds are bis(beta-chloroethyl)phosphite, bis(beta-chloroethyl)phosphate, bis(1,3-dichloropropyl)phosphite and bis(1,3-bichloropropyl)phosphate.

The monoesters of the phosphorus acids are not applicable to the invention because they are not sufficiently soluble in organic solvents. We also found the triesters to be unacceptable except when used in much greater quantities than the diesters.

The amount of flame retardant chemical retained by the treated wood, in order to give satisfactory flame retardance, should be within a range of about 10 to 20 percent by weight of the dry wood. Less than 10 percent retention does not offer proper protection, whereas more than 20 percent retention is found unnecessary.

The concentration of solute in solution depends to a large extent on the void spaces in the particular wood to be treated. The usual impregnating solution contains about 10 to 25 percent of the organic solvent-soluble fire retardant material. For accurate determinations of the concentration of solute required to obtain effective fire retardance, empirical determinations should be made by taking samples of the particular wood to be treated and determining the retention of the fire retardant in the wood.

The impregnation of wood is conveniently accomplished by a full cell cycle. The object of the full cell process is to fill the structure of the wood with the treating solution. This is accomplished by subjecting the treating reactor, containing the wood to be treated, to a vacuum of about 22 to 26 inches of mercury for a period of time ranging from about 15 minutes to an hour. The reactor is then filled with treating solution and subjected to a pressure of about 125 to 200 p.s.i. at 25° to 100° C. for about one and a half to three hours. The larger and more dense pieces of wood require either a longer vacuum period, a longer pressure period of perhaps both. For most woods, a 15 minute vacuum of 25 to 26 inches of mercury followed by a 2 hour pressure process of 160 p.s.i. at 50° to 60° C. is adequate.

Other standard impregnation techniques known to the art can also be used taking into consideration, of course, the physical nature of the wood. For example, impregnation may be accomplished by soaking, by vacuum impregnation at atmospheric pressure, by ultimate application of pressure and vacuum or by the empty cell process. The empty cell process involves forcing the impregnating solution under pressure into the wood containing air. The back pressure caused by compressing the air within the wood, forces out part of the solution when the pressure is released.

Certain low boiling organic solvents are useful for our invention. These solvents should have a boiling point below about 80° C. so that they may be readily removed from the treated wood after impregnation. Solvents useful in our invention are the lower alkyl chlorinated solvents such as chloroform, carbon tetrachloride and methylene chloride, ether and benzene. Mixtures of solvents are also useful in our invention such as benzene with a liquid low boiling alkane, such as pentane and hexane.

The temperature at which impregnation is performed must of necessity vary with the solvent being used. Ambient temperatures are satisfactory. However, the temperature cannot be so high that it will be above the boiling point of the solvent being used at the operating pressure.

The pressure is not critical and wood impregnating pressures may be used such as using a pressure of up to about 150 p.s.i.

The time required for impregnation is the time conventionally used in the wood preserving art and usually varies from about 4 to 12 hours. In most cases, the time should be determined empirically to give consideration to the particular wood being impregnated.

The flame retardance of wood may be conveniently measured by the percentage weight loss in the fire-tube test. A standard test is the ASTM method E–69–50. Using this test, a fire-tube weight loss of approximately 40 percent is indicative of moderate fire retardant activity and 30 percent is considered good. In addition, the rate and extent of flame spread may be observed and estimated.

Our invention is further illustrated by the following examples:

Example I

Ten weighed pieces of southern yellow pine, having the dimension ⅜″ x ¾″ x 40″, were impregnated at ambient temperature with a 15 percent solution of bis(beta-chloroethyl)phosphite in ether. Using the full cell method, the samples were placed in a treating cylinder under an initial vacuum of 27″ Hg for 15 minutes and then a pressure of 150 p.s.i. was applied for 1¼ hours. The solvent was then removed by evaporization under reduced pressures. It was determined that the amount of bis(beta-chloroethyl)phosphite retained by the dry wood was approximately 15 percent. The treated pieces were then tested for fire retardance according to the ASTM method E–69–50 by being placed in a fire-tube apparatus. Results of the test showed a weight loss of 28 percent and slight flame spread.

Example II

The procedure of Example I was repeated using other compounds instead of bis(beta-chloroethyl)phosphite. The dried samples retained approximately 15 percent of the solute. Results are given in the following table:

| Test | Compound | Average Percent Weight Loss | Flame Spread |
|---|---|---|---|
| A | Bis(beta-chloroethyl)phosphate | 30 | Slight. |
| B | Bis(1,3-dichloropropyl)phosphite | 35 | Do. |
| C | Bis(1,3-dichloropropyl)phosphate | 35 | Do. |
| D | Bis(2,3-dichloropropyl)phosphite | 37 | Do. |
| E | Diethyl phosphite | 55 | Rapid and complete. |
| F | Diethyl phosphate | 50 | Do. |
| G | 2-chloroethylphenyl phosphite | 55 | Do. |
| H | Tris(beta-chloroethyl)phosphate | 70 | Slow and complete. |
| I | Tris(dichloropropyl)phosphate | 73 | Moderately fast and complete. |
| J | Bis(chloropropyl)chloropropane phosphonate | 73 | Do. |
| K | Bis(beta-chloroethyl)chloroethyl phosphonate | 70 | Moderate and complete. |
| L | Tetrakis(beta-chloroethyl)pyrophosphate | 65 | Do. |

Example III

The procedure of Example I was repeated using a 30 percent tris(beta-chloroethyl)phosphate in benzene as the impregnating solution. It was determined that the treated samples retained about 30 percent of the solute. Tests showed a weight loss of 35 percent and slight flame spread.

We claim:

1. A method of treating wood with an organic solvent-soluble fire retardant in an organic solution without altering the dimensions of the wood comprising impregnating the wood, under wood impregnating pressure and at a temperature below the boiling point of the solvent at said pressure, with a solution consisting essentially of a solute selected from the group consisting of a compound having the formula:

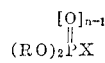

$$(RO)_2PX$$

wherein R is a chlorinated lower alkyl radical, X is a hydroxy radical and $n$ is an integer having a value of from 1 to 2, and an organic solvent having a boiling point below about 80° C. selected from the group consisting of methylene chloride, chloroform, carbon tetrachloride, ether, benzene and mixtures thereof with low boiling alkane cosolvents, whereby the amount of solute retained by said wood is in a range of 10–20 percent by weight of said wood.

2. Method according to claim 1 wherein the solute is bis(beta-chloroethyl)phosphite.

3. Method according to claim 1 wherein the solute is bis(beta-chloroethyl)phosphate.

4. Method according to claim 1 wherein the solute is bis(1,3-dichloropropyl)phosphite.

5. Method according to claim 1 wherein the solute is bis(1,3-dichloropropyl)phosphate.

6. A method of treating wood with an organic solvent-soluble fire retardant in an organic solution without altering the dimensions of the wood comprising impregnating the wood, under wood impregnating pressure and at a temperature below the boiling point of the solvent at said pressure, with a 15 percent solution by weight of bis(beta-chloroethyl)phosphite in an ether solvent, and drying the wood to remove the organic solvent whereby approximately 15 percent of the solvent is retained in the dried wood.

References Cited by the Examiner
UNITED STATES PATENTS

| | | | |
|---|---|---|---|
| 2,143,639 | 1/1939 | Caprio | 117—147 |
| 2,480,790 | 8/1949 | Truhlar | 260—461.315 |
| 2,678,330 | 5/1954 | Van Gorder et al. | 260—461.305 |
| 2,725,311 | 11/1955 | Kenaga et al. | 117—136 |

WILLIAM D. MARTIN, *Primary Examiner.*

RICHARD D. NEVIUS, *Examiner.*

T. G. DAVIS, *Assistant Examiner.*